(12) United States Patent
Chen et al.

(10) Patent No.: US 10,049,503 B2
(45) Date of Patent: Aug. 14, 2018

(54) LINE GUIDED THREE-DIMENSIONAL MODEL RESHAPING METHOD

(71) Applicant: BEIHANG UNIVERSITY, Beijing (CN)

(72) Inventors: Xiaowu Chen, Beijing (CN); Qiang Fu, Beijing (CN); Qinping Zhao, Beijing (CN); Xiaoyu Su, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 12 days.

(21) Appl. No.: 15/338,276

(22) Filed: Oct. 28, 2016

(65) Prior Publication Data

US 2017/0178402 A1 Jun. 22, 2017

(30) Foreign Application Priority Data

Dec. 22, 2015 (CN) .......................... 2015 1 0975341

(51) Int. Cl.
*G06T 19/20* (2011.01)
*G06T 7/00* (2017.01)
*G06F 17/30* (2006.01)

(52) U.S. Cl.
CPC .............. *G06T 19/20* (2013.01); *G06F 17/30* (2013.01); *G06F 17/30259* (2013.01); *G06T 7/0089* (2013.01); *G06T 2219/2021* (2013.01)

(58) Field of Classification Search
CPC ................... G06T 19/20; G06T 7/0089; G06T 2219/2021; G06F 17/30; G06F 17/30259
See application file for complete search history.

(56) References Cited

FOREIGN PATENT DOCUMENTS

| CN | 101004748 A | 7/2007 |
|---|---|---|
| CN | 101593205 A | 12/2009 |
| CN | 102831638 A | 12/2012 |

OTHER PUBLICATIONS

The Chinese First Examination Report of corresponding Chinese patent application No. 201510975341.5, dated Oct. 25, 2017.
A. Shtof et al., "Geosemantic Snapping for Sketch-Based Modeling" Eurographics 2013 / I. Navazo. P. Poulin; vol. 32, No. 2 ; (2013).

(Continued)

*Primary Examiner* — Xiao Wu
*Assistant Examiner* — Chong Wu
(74) *Attorney, Agent, or Firm* — J.C. Patents

(57) ABSTRACT

The invention provides a line guided 3D model reshaping method, including: 1. extracting a contour of an object from an image, and selecting a contour or main skeleton to create a 2D line database; 2. extracting a 3D editable line, retrieving and suggesting an appropriate 2D contour or skeleton from 2D line database; 3. establishing point-to-point correspondence by matching 2D contour or skeleton to 3D editable line, and reshaping the model using parametric deformation method. By the method, 2D contour or skeleton appropriate for 3D model editable line is automatically suggested from 2D line database of multiple classes of objects to guide 3D model reshaping, and fewer user interactions are required in extracting from input 3D model editable lines such as axes, cross-sections and outlines and producing various types of reshaped models by using parametric deformation method, thereby helping user to design desirable 3D model with speed and ease.

3 Claims, 2 Drawing Sheets

(56) References Cited

OTHER PUBLICATIONS

Kai Xu et al., "Photo-Inspired Model-Driven 3D Object Modeling" ACM Transactions on Graphics (TOG)—Proceedings of ACM SIGGRAPH 2011; vol. 30, Issue 4, (Jul. 2011).

Tao Chen et al., "3-Sweep: Extracting Editable Objects from a Single Photo" ACM Transactions on Graphics (TOG)—Proceedings of ACM SIGGRAPH Asia 2013 ; vol. 32, Issue 6, (Nov. 2013).

Xiaohua Xie et al., "Sketch-to-Design: Context-Based Part Assembly" Eurographics—European Association for Computer Graphics ; vol. 32, No. 8; (2013); pp. 233-245.

LINE GUIDED THREE-DIMENSIONAL MODEL RESHAPING METHOD

CROSS-REFERENCE TO RELATED APPLICATIONS

This application claims priority to Chinese Patent Application No. 201510975341.5, filed on Dec. 22, 2015, entitled "Line Guided Three-dimensional Model Reshaping Method", which is hereby incorporated by reference in its entirety.

TECHNICAL FIELD

The present invention relates to a new type of three-dimensional model reshaping method based on two dimensional line guiding, which belongs to the field of computer graphics.

BACKGROUND

With the development of three-dimensional (3D) modeling and computer aided design technologies, attentions have been growing on line guided 3D modeling technologies in recent years. However, most of existing methods focus on using the 2D contour of an object of the same class to model and reshape a 3D model, and such restrictions on contours mean that existing methods can only provide a limited selection of reshaped models. Yet in the field of artistic design, many cross-class elements are introduced to model designs and constructions. Hence model reshaping methods restricted to depending solely on contours of objects of the same class could not sufficiently satisfy the industry needs.

A line guided 3D model reshaping method refers to reshaping a 3D model by applying constraints and deformations to the entire or part of an input 3D model based on the guidance of a 2D contour or skeleton.

Many research works have been done in recent years about shaping 3D models based on constraints of contour. In 2011, Xu et al. edited and reshaped 3D models using the contour of an object of the same class extracted from an image. In 2013, Xie et al. constructed models by combining candidate parts suggested from hand-sketched contour. In 2013, Chen et al. constructed a 3D model from contour of an object in an image and conducting image editing on the model. In 2013, Shtof et al. constructed a model by combining 3D model parts which are directly shaped from hand-sketched contour. According to the method of the present invention, a great variety of model evolutions can be produced by reshaping the input 3D model according to contours of multiple classes of objects, providing ordinary users with a model design system for reshaping existing 3D models using contours from any image.

SUMMARY

The present invention aims at providing a line guided three-dimensional model reshaping method. To fulfill the objective of the present invention, the technical solution employed is: firstly, extract a contour of an object from an image, and based on symmetry information of the object, select the object's contour or skeleton to create a 2D line database; then, extract a 3D editable line from a user selected region in an input 3D model, and retrieve and suggest an appropriate 2D line from the 2D line database; and finally, establish a point-to-point correspondence by matching the 2D contour to the 3D editable line, and deform the user selected region in the input 3D model by using a parametric deformation method, thereby reshaping the 3D model. Particular steps are described as the following.

The present invention provides a line guided three-dimensional model reshaping method, including:

step S100, creating a 2D line database: extracting a contour of an object from an Internet image containing a single object by using an image segmentation algorithm, and creating a 2D line database by selecting a contour or a main skeleton based on symmetry of the object;

step S200, retrieving and suggesting a 2D line: allowing a user to select an editable region in a 3D model; extracting a 3D editable line; and suggesting a corresponding line (e.g. a contour or a skeleton) in the 2D line database based on a shape context descriptor and a shape feature; and step S300, line matching and parametric deformation: establishing a point-to-point correspondence between the 2D contour or skeleton and the 3D editable line; and reshaping an input model by using a parametric deformation algorithm.

The creating a 2D line database in step S100 includes:

step S110: extracting a contour of an object from an Internet image containing a single object by using a visual saliency detection and an image segmentation algorithm; and step S120: detecting reflectional symmetry and rotational symmetry of the object in the image by using a symmetry detection algorithm; and if the object in the image has reflectional symmetry, symmetrically turning a half part of the object's contour about a symmetrical axis to create a contour perfectly symmetrical about the symmetrical axis; or, if the object in the image has rotational symmetry, directly taking the object's contour; or, if the object in the image is asymmetrical, generating the object's skeleton by using a skeleton extraction algorithm, and taking the longest skeleton as a main skeleton, creating evenly spaced sampling points along the skeleton, and smoothing the main skeleton by using spline curve fitting; and creating a 2D line database based on the contour and the main skeleton obtained in the foregoing steps.

The retrieving and suggesting a 2D line in step S200 includes:

step S210: extracting an editable line from an editable region selected by a user on an input 3D model, wherein the editable line of the 3D model comprises: an axis, a cross-section and an outline; calculating a shape context distance $SC(l_i, l_j)$ between the 2D contour or skeleton $l_i$ and the 3D editable line $l_j$, and a length-to-width ratio diversity distance $\|P(l_i)-P(l_j)\|_2^2$ of a normalized oriented bounding box (OBB) of each line; and evaluating a distance metric between the 2D contour or skeleton and the 3D editable line by calculating a weighted sum of the shape context distance and the diversity distance:

$$D(l_i, l_j)=(1-\omega)SC(l_i, l_j)+\omega\|p(l_i)-p(l_j)\|_2^2; \text{ and}$$

step S220: selecting and suggesting a 2D contour having the shortest distance metric $D(l_i, l_j)$ to the 3D editable line by adjusting the weight $\omega$ of the step S210, where the axis of the model is matched to the main skeleton in the 2D line database and the part of contour on one side of the symmetrical axis, and the cross-section and the outline are matched to the reflectionally or rotationally symmetrical contour in the 2D line database.

The line matching and parametric deformation in step S300 includes:

step S310: identify for each vertex $v_n$ on the 3D editable line a corresponding point $v'_m$ on the 2D contour or skeleton based on proportional relation of length, where the matching is derived using:

$$\underset{v'_m}{\operatorname{argmin}} = \left\| \frac{d(v_n, v_1)}{L(V)} - \frac{d(v'_m, v'_1)}{L(V')} \right\|_2^2,$$

where $d(v_n, v_1)$ is a line length between a point $v_n$ and an endpoint $v_1$, and $L(V)$ is the length of the whole line;

step S320: after establishing the point-to-point correspondence between the 2D contour or skeleton and the 3D editable line, transferring a relative position of each of the vertexes on the 2D contour or skeleton onto the 3D editable line; when a position parameter of the endpoint is denoted as $p(v_1)$, a position parameter $p(v_n)$ of the point $v_n$ is obtained according to the following:

$$p(v_n) = p(v_1) + dp(v'_m) \frac{l(v)}{l(v')},$$

where $dp(v'_m)$ is a vector from the endpoint to the point $v'_m$ on the 2D contour or skeleton, and $$\frac{l(v)}{l(v')}$$

is a scaling factor;

step S330: deforming the 3D model by applying the parametric deformation method in the previous step with the user selected 3D editable line and the suggested 2D contour line, to obtain a reshaped result of the input model.

The present invention provides a line guided three-dimensional model reshaping method, which offers the following advantages and effects: 1. automatically suggesting, from a 2D line database of multiple classes of objects, a 2D contour or skeleton appropriate for a 3D model editable line so as to guide the reshaping of the 3D model; 2. extracting, from an input 3D model, editable lines such as axes, cross-sections and outlines, and producing various types of reshaped models using a parametric deformation method, thereby helping a user to design a desirable 3D model with speed and ease.

DESCRIPTION OF EMBODIMENTS

Now the present invention will be explained in detail in conjunction with the accompany drawings.

Figure 1:
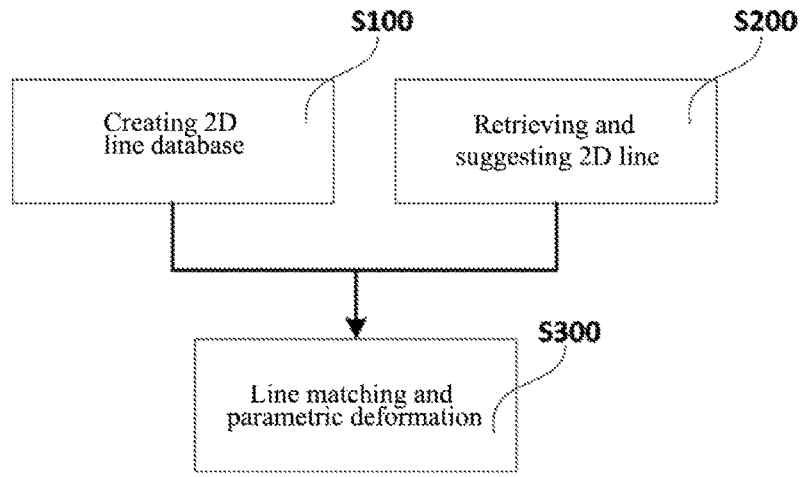
FIG. 1 is a flowchart of a line guided three-dimensional model reshaping method according to the present invention.

FIG. 1 is a flowchart of a line guided three-dimensional model reshaping method according to the present invention. The method includes three steps:

step S100, creating a two-dimensional (2D) line database: extract a contour of an object from an Internet image containing a single object by using an image segmentation algorithm, and create a 2D line database by selecting a contour or a main skeleton based on symmetry of the object;

step S200, retrieving and suggesting a 2D contour or skeleton: allow a user to select an editable region on a three-dimensional (3D) model; extract a 3D editable line; and suggest a corresponding contour or skeleton in the 2D line database based on a shape context descriptor and a shape feature; and step S300, line matching and parametric deformation: establish a point-to-point correspondence between the 2D contour or skeleton and the 3D editable line; and reshape an input model by using a parametric deformation algorithm.

Figure 2:
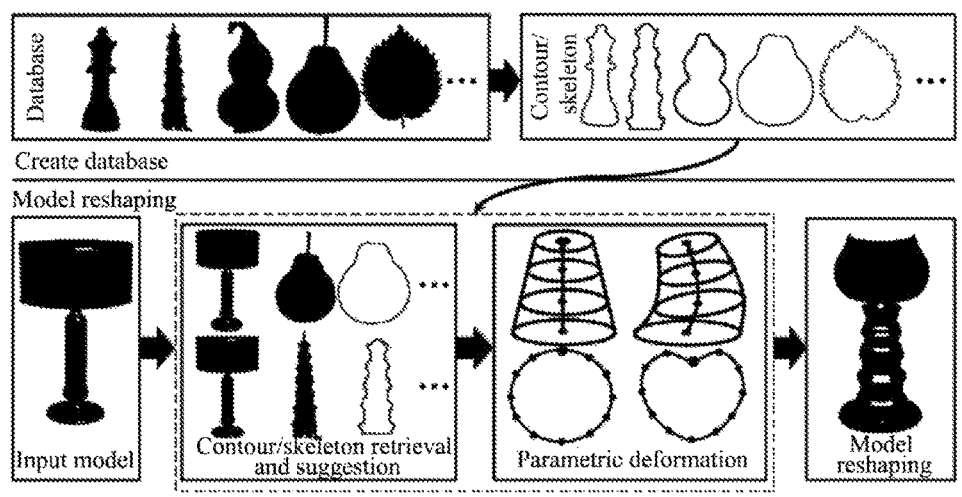
FIG. 2 is a schematic diagram of reshaping an input model according to the present invention.

FIG. 2 is a schematic diagram of reshaping an input model according to the present invention, which illustrates the process of deforming and reshaping an input model by using the contour or skeleton retrieved and suggested from the database.

The "creating a 2D line database" in step S100 includes:

step S110: extract a contour of an object from an Internet image containing a single object by using a visual saliency detection and an image segmentation algorithm; and step S120: detect reflectional symmetry and rotational symmetry of the object in the image by using a symmetry detection algorithm; and if the object in the image has reflectional symmetry, symmetrically turn a half part of the object's contour about a symmetrical axis to create a contour perfectly symmetrical about the symmetrical axis; or, if the object in the image has rotational symmetry, directly take the object's contour; or, if the object in the image is asymmetrical, generate the object's skeleton by using a skeleton extraction algorithm, and take the longest skeleton as a main skeleton, create evenly spaced sampling points along the skeleton, and smooth the main skeleton by using spline curve fitting; and create a 2D line database based on the contour and the main skeleton obtained in the foregoing steps.

The "retrieving and suggesting a 2D contour or skeleton" in step S200 includes:

step S210: extract an editable line from an editable region selected by a user on an input 3D model, where the editable line of the 3D model includes: an axis, a cross-section and an outline; calculate a shape context distance $SC(l_i, l_j)$ between the 2D contour $l_i$ and the 3D editable line $l_j$, and a length-to-width ratio diversity distance $\|p(l_i)-p(l_j)\|_2^2$ of a normalized oriented bounding box (OBB) of each line; and evaluate a distance metric between the 2D contour or skeleton and the 3D editable line by calculating a weighted sum of the shape context distance and the diversity distance:

$$D(l_i, l_j) = (1-\omega)SC(l_i, l_j) + \omega\|p(l_i)-p(l_j)\|_2^2; \text{ and}$$

step S220: suggest an appropriate 2D contour or skeleton based on the distance metric $D(l_i, l_j)$ and the 3D editable line by adjusting the weight $\omega$ of the step S210. In this step, the axis of the 3D editable line is matched to the main skeleton and the part of the contour on one side of the symmetrical axis, and the cross-sections and the outlines are matched to reflectionally and rotationally symmetrical contours in the 2D line database.

Figure 3:
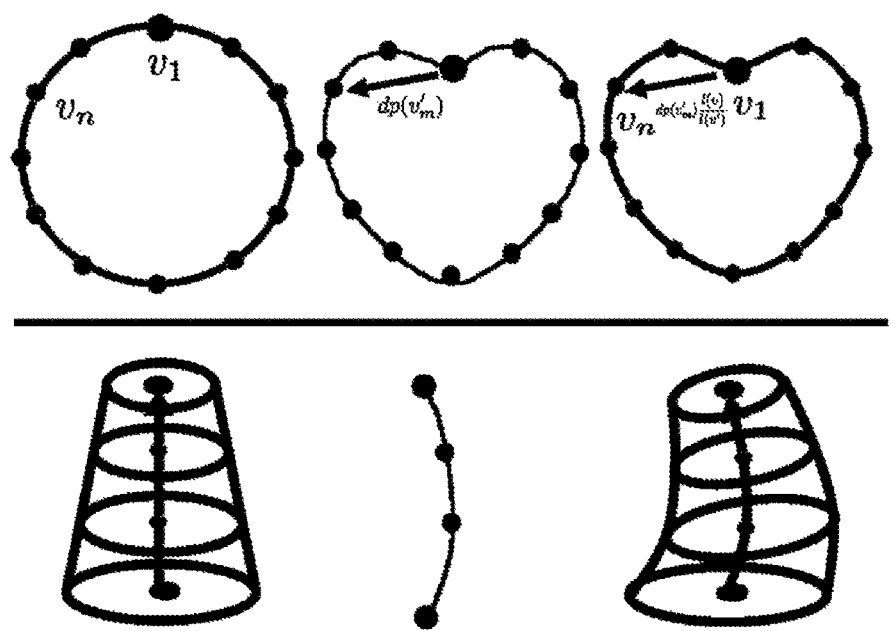
FIG. 3 is a schematic diagram of parametric deformation according to the present invention.

FIG. 3 is a schematic diagram of parametric deformation according to the present invention, which shows the procedure of deforming the 3D editable line of a model under the guidance of a matching 2D contour or skeleton.

The "line matching and parametric deformation" in step S300 includes:

step S310: identify for each vertex $v_n$ on the 3D editable line a corresponding point $v'_m$ on the 2D contour or skeleton based on proportional relation of length, where the matching is derived using:

$$\underset{v'_m}{\operatorname{argmin}} = \left\| \frac{d(v_n, v_1)}{L(V)} - \frac{d(v'_m, v'_1)}{L(V')} \right\|_2^2,$$

where $d(v_n, v_1)$ is a line length between a point $v_n$ and an endpoint $v_1$, and $L(V)$ is the length of the whole line;

step S320: after establishing the point-to-point correspondence between the 2D contour or skeleton and the 3D editable line, transfer a relative position of each of the vertexes on the 2D contour or skeleton onto the 3D editable line; assuming that a position parameter of the endpoint is denoted as $p(v_1)$, a position parameter $p(v_n)$ of the point $v_n$ is derived according to the following:

$$p(v_n) = p(v_1) + dp(v'_m) \frac{l(v)}{l(v')},$$

where, $dp(v'_m)$ is a vector from the endpoint to point $v'_m$ on the 2D contour or skeleton, and $$\frac{l(v)}{l(v')}$$

is a scaling factor;

step S330: deform the 3D model by applying the parametric deformation method in the previous step with the user selected 3D editable line and the suggested 2D contour or skeleton, to obtain a reshaped result of the input model.

In this manner, the present invention disclosed a line guided three-dimensional model reshaping method, which can use an Internet image of multiple classes of objects to create a line database, select an appropriate contour or skeleton by a match-suggestion algorithm, and reshape a selected region in a 3D model through guided deformation. The method includes three steps: firstly, extract a contour of an object from an image, and based on symmetry information of the object, select the object's contour or main skeleton to create a 2D line database; then, extract a 3D editable line from a user selected region in an input 3D model, and retrieve and suggest an appropriate 2D line from the 2D line database; and finally, establish a point-to-point correspondence by matching the 2D contour or skeleton to the 3D editable line, deform the user selected region in the input 3D model by using a parametric deformation method, thereby reshaping the 3D model. The present invention provides two inventive steps, the first being: automatically suggesting, from a 2D line database of multiple classes of objects, a 2D contour or skeleton appropriate for a 3D model editable line so as to guide the reshaping of the 3D model; and the second being: extracting, from an input 3D model, editable lines such as axes, cross-sections and outlines, and producing various types of reshaped models using a parametric deformation method, thereby helping a user to design a desirable 3D model with speed and ease. The line guided three-dimensional model reshaping method described in the present invention allows for rapid creation of massive varieties of 3D models, which provides 3D materials for applications such as producing 3D animations and creating 3D virtual scenes.

What is claimed is:

1. A line guided three-dimensional model reshaping method applied on a computer system, comprising:

step S100, creating, by a processor of the computer system, a two-dimensional (2D) line database: extracting a 2D contour of an object from an Internet image containing a single object by using an image segmentation algorithm, and creating a 2D line database by selecting a 2D contour or a 2D main skeleton based on symmetry of the object;

step S200, retrieving and suggesting, by the processor of the computer system, a 2D line: selecting, by a user, an editable region in an input three-dimensional (3D) model; extracting a 3D editable line; and suggesting a corresponding 2D contour or skeleton in the 2D line database based on a shape context descriptor and a shape feature;

step S300, contour matching and parametric deformation performed by the processor of the computer system: establishing a point-to-point correspondence between the 2D contour or skeleton and the 3D editable line; and reshaping the 3D model by using a parametric deformation algorithm;

the retrieving and suggesting, by the processor of the computer system, a 2D line in step S200 comprises:

step S210: extracting an editable line from an editable region selected by a user in an input 3D model, wherein the editable line of the 3D model comprises: an axis, a cross-section and an outline; calculating a shape context distance $SC(l_i, l_j)$ between the 2D contour or skeleton $l_i$, and the 3D editable line $l_j$, and a length-to-width ratio diversity distance $\|p(l_i) - p(l_j)\|_2^2$ of a normalized oriented bounding box (OBB) of each line; and evaluating a distance metric between the 2D contour or skeleton and the 3D editable line by calculating a weighted sum of the shape context distance and the diversity distance:

$D(l_i, l_j) = (1-\omega)SC(l_i, l_j) + \omega\|p(l_i) - p(l_j)\|_2^2$; and step S220: selecting and suggesting a 2D contour or skeleton having the shortest distance metric $D(l_i, l_j)$ to the 3D editable line by adjusting the weight $\omega$ of the previous step, wherein the axis of the 3D model is matched to the 2D main skeleton in the 2D line database and the part of 2D contour on one side of the symmetrical axis, and the cross-section and the outline are matched to the reflectionally or rotationally symmetrical 2D contour in the 2D line database.

2. The line guided three-dimensional model reshaping method according to claim 1, wherein the creating, by the processor of the computer system, a 2D line database in step S100 comprises:

step S110: extracting a 2D contour of an object from an Internet image containing a single object by using a visual saliency detection and an image segmentation algorithm; and step S120: detecting reflectional symmetry and rotational symmetry of the object in the image by using a symmetry detection algorithm; and if the object in the image has reflectional symmetry, symmetrically turning a half of the 2D contour of the object about a symmetrical axis to create a 2D contour perfectly symmetrical about the symmetrical axis; or, if the object in the image has rotational symmetry, directly taking the 2D contour of the object; or, if the object in the image is asymmetrical, generating the 2D skeleton of the object by using a skeleton extraction algorithm, and taking the longest 2D skeleton as a 2D main skeleton, creating evenly spaced sampling points along the 2D skeleton, and smoothing the 2D main skeleton by using spline curve fitting; and creating a 2D line database based on the 2D contour and the 2D main skeleton obtained in the foregoing steps.

3. The line guided three-dimensional model reshaping method according to claim 1, wherein the line matching and parametric deformation performed by the processor of the computer system in step S300 comprises:

step S310: identifying, for each vertex $v_n$ on the 3D editable line, a corresponding point $v'_m$ on the 2D contour or skeleton based on proportional relation of length, wherein the matching is derived using:

$$\underset{v'_m}{\operatorname{argmin}} = \left\| \frac{d(v_n, v_1)}{L(V)} - \frac{d(v'_m, v'_1)}{L(V')} \right\|_2^2,$$

wherein, $d(v_n, v_1)$ is a line length between a point $v_n$ and an endpoint $v_1$ along the 3D editable line, $d(v'_m, v'_1)$ is a line length between a point $v'_m$ and an endpoint $v'_1$ along the 2D contour or 2D main skeleton, $L(V)$ is the length of the 3D editable line, and $L(V')$ is the length of the 2D contour or 2D main skeleton;

step S320: after establishing the point-to-point correspondence between the 2D contour or skeleton and the 3D editable line, transferring a relative position of each of the vertexes $v'_m$ on the 2D contour or skeleton onto each of the vertexes $v_n$ on the 3D editable line; when $p(v_1)$ denotes a position parameter of the endpoint $v_1$ on the 3D editable line, a position parameter $p(v_n)$ of the point $v_n$ is obtained according to the following:

$$p(v_n) = p(v_1) + dp(v'_m) \frac{l(v)}{l(v')},$$

wherein, $dp(v'_m)$ is a vector from the endpoint $v'_1$ to the point $v'_m$ on the 2D contour or skeleton, $$\frac{l(v)}{l(v')}$$

is a scaling factor for ensuring consistent dimension after transferring the position, $l(v)$ is a dimension of the 3D editable line, and $l(v')$ is a dimension of the 2D contour or the 2D main skeleton; and step S330: deforming the 3D model by applying the parametric deformation method in the previous step with the user selected 3D editable line and the suggested 2D contour or skeleton, to obtain a reshaped result of the 3D model.

* * * * *